US007028295B2

(12) United States Patent
Li et al.

(10) Patent No.: US 7,028,295 B2
(45) Date of Patent: Apr. 11, 2006

(54) DYNAMIC JAVA CLASS LOADING FOR APPLICATION EXECUTION

(75) Inventors: Chia-Hsin Li, San Jose, CA (US);
Steve Nelson, San Jose, CA (US);
Brian Chan, Palo Alto, CA (US)

(73) Assignee: Seiko Epson Corporation, Tokyo (JP)

( * ) Notice: Subject to any disclaimer, the term of this patent is extended or adjusted under 35 U.S.C. 154(b) by 802 days.

(21) Appl. No.: 09/999,658

(22) Filed: Oct. 31, 2001

(65) Prior Publication Data
US 2003/0097400 A1  May 22, 2003

(51) Int. Cl.
*G06F 9/445* (2006.01)
(52) U.S. Cl. .................. 717/178; 717/173; 709/223
(58) Field of Classification Search ........ 717/162–178, 717/148, 114, 116, 118, 120–122; 715/700, 715/749, 762, 763, 789, 811, 961, 965–969; 709/200–203, 220–224; 719/310, 313–315
See application file for complete search history.

(56) References Cited

U.S. PATENT DOCUMENTS

| | | | | |
|---|---|---|---|---|
| 4,864,569 A | 9/1989 | DeLucia et al. | ............... | 714/38 |
| 5,485,601 A | 1/1996 | Ching | .................. | 717/106 |
| 5,500,941 A | 3/1996 | Gil | .................. | 714/38 |
| 5,555,416 A | 9/1996 | Owens et al. | ................ | 717/178 |
| 5,732,275 A | 3/1998 | Kullick et al. | ............... | 717/170 |
| 5,754,858 A | 5/1998 | Broman et al. | ............. | 717/111 |
| 5,790,796 A | 8/1998 | Sadowsky | .................. | 709/221 |
| 5,805,891 A | 9/1998 | Bizuneh et al. | ............. | 717/121 |
| 5,974,454 A | 10/1999 | Apfel et al. | ................ | 709/221 |
| 6,023,586 A | 2/2000 | Gaisford et al. | ............. | 717/178 |
| 6,066,182 A * | 5/2000 | Wilde et al. | ................. | 717/175 |
| 6,067,582 A | 5/2000 | Smith et al. | ................... | 710/5 |
| 6,131,192 A | 10/2000 | Henry | ........................ | 717/175 |
| 6,154,680 A | 11/2000 | White et al. | .................. | 700/19 |
| 6,433,794 B1 * | 8/2002 | Beadle et al. | ............... | 715/700 |
| 6,718,549 B1 * | 4/2004 | Narin et al. | ................ | 717/178 |
| 6,836,886 B1 * | 12/2004 | Tuerke et al. | ............... | 717/178 |
| 2002/0188434 A1* | 12/2002 | Shulman et al. | ............. | 703/21 |
| 2003/0088710 A1* | 5/2003 | Sandhu et al. | ............. | 709/321 |

OTHER PUBLICATIONS

Tip et al., Practical Experience with an Application Extractor for Java, Nov. 1999, OOPSLA'99, Denver CO., USA.*
Quetzalcoatl et al., JAZZ An Efficient Compressed Format for JAVA Archive Files, 1998, ACM.*

* cited by examiner

Primary Examiner—Antony Nguyen-Ba

(57) ABSTRACT

Methods and an apparatus for downloading an application over a distributed network are provided. One exemplary method includes a computer implemented method executed by a general purpose computer, where the computer implemented method is capable of downloading an executable program from a networked storage to the general purpose computer. The method initiates with downloading a core module where the core module includes classes necessary to run an engine of the executable program. Then, the core module is installed which in turn module provides instant user functionality. The installed core module includes code for, requesting a class not associated with the core module, searching non-core modules of the executable program for the requested class, and downloading to the general purpose computer a non-core module containing the requested class while the executable program provides the user functionality.

16 Claims, 10 Drawing Sheets

| Priority | Module |
|----------|--------|
| 1 | $M_c$ |
| 2 | $M_1$ |
| 3 | $M_2$ |
| 4 | $M_3$ |
| 5 | $M_4$ |
| 6 | $M_5$ |

FIG. 9

DYNAMIC JAVA CLASS LOADING FOR APPLICATION EXECUTION

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

CROSS REFERENCE TO RELATED APPLICATIONS

This application is related to U.S. patent application Ser. No. 10/001,085, filed on the same day as the instant application and entitled "DYNAMIC CLASS PACKAGING." This application is hereby incorporated by reference.

BACKGROUND OF THE INVENTION

1. Field of the Invention

This invention relates generally to methods and apparatus for downloading an executable program and more particularly for providing an optimal and intelligent mode to speed up the downloading of an executable program from the Internet.

2. Description of the Related Art

The explosive growth of the Internet has brought with it many capabilities to the work and home environments. The ability to download applications and software, especially JAVA related applications, promises to further enhance the functionality of personal computers in the office or home environment. However, the slow speed to download a program from the Internet acts as a major impediment to users being able to appreciate these capabilities.

FIG. 1 illustrates block diagram 100 depicting the prior art manner of downloading an executable program from the Internet to run a JAVA software application through a web browser such as Internet Explorer™ or Netscape Navigator™. Server 102 has a hyper text mark-up language (HTML) page 104. The HTML page 104 is downloaded to the client 108 through a web browser 110 via the Internet 106. An ActiveX control 112 which is downloaded to the client 108 and is caused to be run by the web browser 110. The ActiveX control includes the Object Linking and Embedding Control (OCX) 114, a zip file 116 which includes JAVA programs and class files and an .inf file which provides the system with the necessary information to install the OCX 114 and the zip file 116. Once the ActiveX 112 control is executed, the JAVA programs from the zip file 116 can be executed. The OCX, zip file and .inf files are packaged in a .cab file. Accordingly, the ActiveX installs the .cab file and decompresses the zip file to run the different JAVA application classes through the web browser.

Because the entire .cab file must be downloaded prior to the JAVA application being run, the delays imposed by the prior art method of downloading the application discourage users from downloading applications over the Internet unless very fast Internet access is available. For example, a typical .cab file could take five minutes or more to download and install using a 56K dial-up modem. Even if the user does not use some of the classes, the user must wait for all the classes contained in the zip file to be downloaded before functional use can occur. The wait time further increases as the functionality of the software is enhanced since the .cab file grows larger with additional or enhanced functionality.

While the problem exists with initial downloads of applications, it also extends to modifications of applications. For example, if a 1 Kilobyte modification is made to an existing program for a new revision or an update, then the user will have to download the complete application or mail order a disc or floppy disk with the revised application. However, in an effort to contain costs, companies are encouraging users to download files over the Internet rather than shipping compact discs or floppy disks for new or revised applications.

Although there is the possibility to provide patches in some instances, the management of patches becomes unwieldy. For example, when multiple patches are installed problems arise where a later available patch is installed, but an earlier patch was either not installed or installed after the later patch. In this situation, the program may not function properly and the problem compounds itself as future patches are issued. Therefore, the management of the patch installation prevents patches from becoming a viable alternative.

As a result, there is a need to solve the problems of the prior art to provide a method for downloading applications from the Internet in a quick and efficient manner while keeping the functionality of the application available to a user.

SUMMARY OF THE INVENTION

Broadly speaking, the present invention fills these needs by providing a method and apparatus for efficiently downloading applications via the Internet. It should be appreciated that the present invention can be implemented in numerous ways, including as a process, an apparatus, a system, or a device. Several inventive embodiments of the present invention are described below.

In one embodiment, a computer implemented method executed by a general purpose computer, where the computer implemented method is capable of downloading an executable program from a networked storage to the general purpose computer is provided. The method initiates with downloading a core module where the core module includes classes necessary to run an engine of the executable program. Then, the core module is installed which in turn provides instant user functionality. The installed core module includes code for, requesting a class not associated with the core module, searching non-core modules of the executable program for the requested class, and downloading to the general purpose computer a non-core module containing the requested class while the executable program provides the user functionality.

In another embodiment, a method for downloading modules of an application in a multithread environment is provided. The downloading occurs while a core module of the application is running which allows user application interaction with features of the application. The method executed by the core module initiates with a first module being requested while downloading a second module. Then, the downloading of the second module is suspended. Next, the first module is downloaded. Then, the downloading of the second module is resumed after the first module completes its downloading, whereby the running application enables user application interaction of basic functions facilitated by the core module. Additionally, the use of functionality provided by each of the first module and the second module is enabled upon completion of a background install while the application is running.

In still another embodiment, a method for downloading modules from a distributed network to a general purpose computer for an application, while the application is running on the general purpose computer is provided. The method initiates with enabling a selection of an application. Next, a core module which runs an engine of the selected application is identified. Then, the core module is downloaded and installed. Next, an election of a feature associated with a non-core module of the application is enabled. In response to the election of the feature associated with the non-core module, the method includes determining if the non-core module is locally available on the general purpose computer, downloading the non-core module from the distributed network if the non-core module is not locally available, and installing the non-core module. The determining, downloading and installing are executed while enabling user access and interaction to installed features of the core module.

In yet another embodiment, a computer implemented method for installing an application program on a general purpose computer is provided. The method initiates with determining if a core module is locally available on the general purpose computer. The determining includes determining if the core module is the most recent version if the core module is locally available on the general purpose computer. In response to the core module not being available or the core module not being the most recent version, the method further includes downloading the core module, where the core module includes classes necessary to run an engine of the application program. Then, the core module is installed. The installed core module provides instant user functionality. Next, a need for non-core modules is predicted. Then, the predicted non-core modules are downloaded while the application program is being executed.

In still yet another embodiment, a method for downloading a computer program from a network to a general purpose computer, where the computer program is compartmentalized into modules is provided. The method initiates with downloading a core module. The core module includes classes necessary to run an engine of the computer program. Then, the core module is installed. The installed core module provides instant user functionality. Next, non-core modules are downloaded according to a priority list. Then, one of the non-core modules which has not been downloaded or is not being downloaded is requested in response to a user requesting a feature functionality. Next, the downloading of the non-core modules according to the priority list paused. Then, the downloading of the one of the non-core modules containing the feature functionality is started. Next, the one of the non core modules is installed. Then, the downloading of the non-core modules according to the priority list is resumed.

In another embodiment, an apparatus for downloading an application is provided. The apparatus includes a storage unit for storing coded instructions for executing the application. A monitor is included for presenting application features to a user. The application features are associated with modules of the application and the modules contain the coded instructions for executing the application features. A processor is also included. The processor is configured to process the coded instructions where the coded instructions are configured to download and install a core module of the application. The core module is capable of running an engine of the application and instantly allowing user interaction with the application, wherein in response to the user selecting one of the application features associated with a non-core module, the non-core module is downloaded, installed, and enabled for immediate functional use along with functionality provided by the core module.

In yet another embodiment, a computer readable media having program instructions for downloading an executable program from a network is provided. One exemplary computer readable media includes program instructions for downloading a core module where the core module includes classes necessary to run an engine of the executable program. In addition, the computer readable media includes program instructions for installing the core module. The installed core module further includes program instructions for requesting a class not associated with the core module, searching non-core modules for the requested class, and downloading a non-core module containing the requested class while the executable program provides the user functionality.

The advantages of the present invention are numerous. Most notably, an executable program can be downloaded efficiently via a distributed network. By downloading a core module containing the necessary code for running an engine of the program, the user can run the program without any excessive delays even when downloading the program though a dial-up connection. Additionally, the capability of predicting modules for downloading needed by a user or downloading modules in a background provides further flexibility and efficiency in a manner transparent to the user.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

FIG. 9 illustrates a block diagram representing a priority list of the various modules to be downloaded for an application in accordance with one embodiment of the invention.

DETAILED DESCRIPTION OF THE PREFERRED EMBODIMENTS

Figure 1:
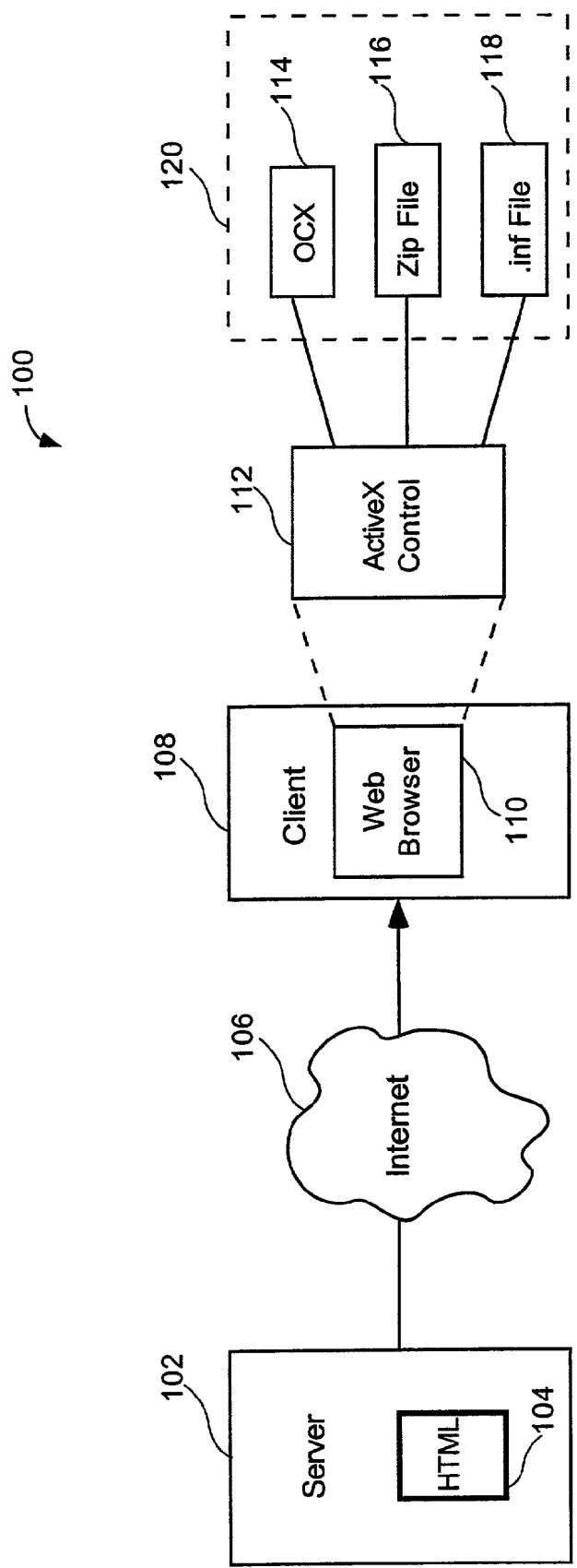
FIG. 1 illustrates a block diagram depicting the prior art manner of downloading an executable program from the Internet to run a JAVA software application through a web browser.

An invention is described for an apparatus and method for the efficient and orderly downloading of an application where a core module containing the classes necessary for running an engine of the application are initially downloaded. Then, in one embodiment, remaining non-core modules are downloaded in the background, even if the application is running and, if necessary are automatically uploaded into the running program. It will be obvious, however, to one skilled in the art, that the present invention may be practiced without some or all of these specific details. In other instances, well known process operations have not been described in detail in order not to unnecessarily obscure the present invention.

The embodiments of the present invention provide a method and an apparatus for providing efficient Internet distribution of application components to end users from a centrally located source (e.g., a vender of hardware and software). In one embodiment a user can access a web site to choose different applications and options. As used herein, the embodiments that enable efficient handling and downloading of an application and components is generic to any kind of application and application components. However, for ease of discussion, reference will be made to a printer and the application options available to the user of the printer. These applications and options may be, for example, available on the vendor's website. Following this example, applications for the printer may be for creating greeting cards, creating invitations, creating book covers, creating art templates, creating business cards, creating gift wrappers, creating gift boxes, etc. Once the user has selecting an application option, that application option will have additional sub-options that can be chosen from a number of sub-options. In one embodiment, an option may be selected where additional content can be included to generate a project, such as adding a graphic to a greeting card.

In one embodiment, all the program selection options, or groups of program selection options, integral to a complete program can be identified, and a module of software classes is created for each selection option or group of selection options. The modules are selected such that each module contains all the classes necessary for implementing a specific program task. For example, one module may include all the classes for generating a graphical user interface (GUI), another for selecting and downloading images, a third for printing, a fourth for rotating or cutting an image, etc. At least one module, in one embodiment, must include the core classes necessary to run the engine of the application in one embodiment. The core module may accept instructions from the command line, or preferably, the core module downloads and installs the GUI module to provide the user with a more convenient interface.

To speed up the downloading of a program, when the executable program is to be downloaded, only the core module is initially downloaded. The core module then downloads and installs the GUI module, which presents the user with various program options. In one embodiment, while the program is running and as a user selects options not part of the core module, the core module checks to see if the module capable of implementing the selected option is locally available (e.g., on a users drive or network drives). In another embodiment, if the required module is not locally available, the required module is downloaded from the Internet and automatically uploaded into the running program. If the required module has been previously downloaded, then the core module checks to see if the current version of the required module is older than the version of the core module. If the version of the available, required module is not older than the core module, the locally available module is used, but if it is older, then a newer module is downloaded from the Internet.

In another embodiment, the application may make predictions of future module needs based on current user selections, and download in the background additional modules the core module expects to need in the near future. For example, if the user downloads and edits a picture image using a application, the core module of the application may expect that the user will likely want to print the edited image. In this case, the print module may be downloaded prior to the user finishing the edits, thus allowing for a quicker and more efficient manner to download executable files from the Internet while keeping the full functionality of the application available to the user. In yet another embodiment, the predictive downloads of modules may be based on statistical analysis of observed user behavior such that seemingly unrelated program selections may be linked for background downloads.

Figure 2:
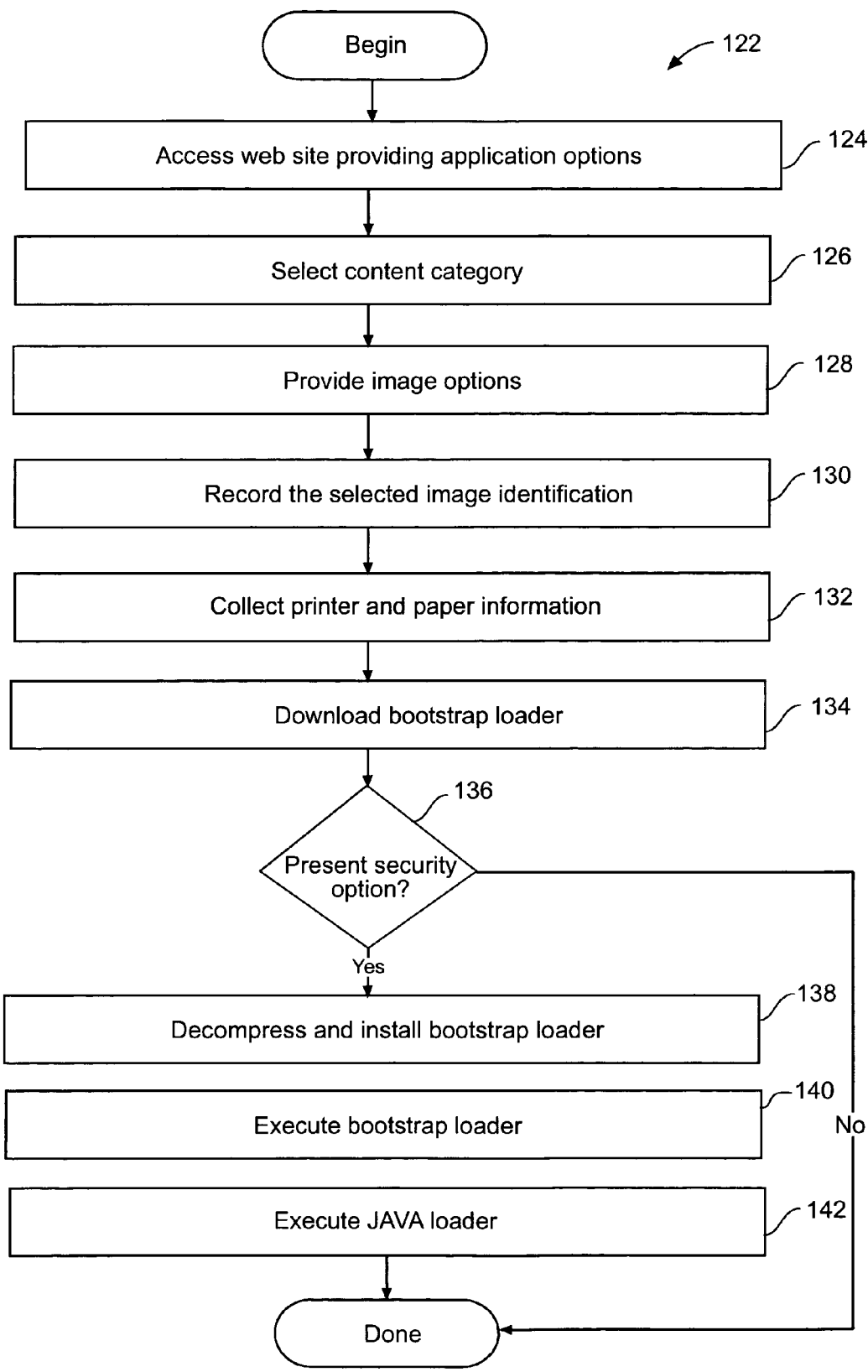
FIG. 2 illustrates a flowchart depicting an overview of a method for downloading an application from the Internet in accordance with one embodiment of the invention.

FIG. 2 illustrates flowchart 122 depicting an overview of a method for downloading an application from the Internet in accordance with one embodiment of the invention. Flowchart 122 initiates with operation 124 where a web site providing application options is accessed. As mentioned earlier, the application and its options can be for any type of application the enables execution by one or more processing entities. In the example of a printer coupled to a personal computer, an application may include functionality for creating greeting cards, invitations, book cover, art template, business cards, gift wrappers, gift boxes, etc. The method advances to operation 126 where a content category is selected from the list of options. Here, the user selects one of the above mentioned applications from operation 124 and a list of content categories is presented to the user. For example, the user may choose to create a greeting card and then be presented with a list of content categories to be used for the greeting card. Of course, any number of images fit for a greeting card can be presented here such as a floral arrangement, a print, a photo of a movie star, etc. Then in operation 128, image options for the selected content category are provided. In one embodiment, the image is stored in a database. The method then proceeds to operation 130 where the selected image identification is recorded. Here, the image is stored for later use by the JAVA application.

Continuing with FIG. 2, printer and paper information is collected in operation 132. The printer model, paper size, margin information, etc. are collected in one embodiment. Next, in operation 134 a bootstrap loader is downloaded. Here, the web browser downloads and installs a .cab file which can be used for loading a JAVA application and different modules associated with the JAVA application. The method proceeds to operation 136 where the user is presented with a security option. In one embodiment if the user refuses the security option then the method will terminate. Assuming the user accepts the security option then the method advances to operation 138 where the web browser decompresses and installs the bootstrap loader i.e., .cab file. Next, in operation 140 the bootstrap loader is executed. In one embodiment, the bootstrap loader is in the form of an ActiveX control. The method then proceeds to operation 142 where the bootstrap loader will start a JAVA loader. In one embodiment the JAVA loader is included in the .cab file. As will be explained below in more detail, the JAVA loader enables the downloading of the desired application in an efficient and expeditious manner, no matter if the user has a relatively slow Internet connection. That is, the application will be immediately available for use, no matter if all of the components needed for a task have been downloaded.

Figure 3:
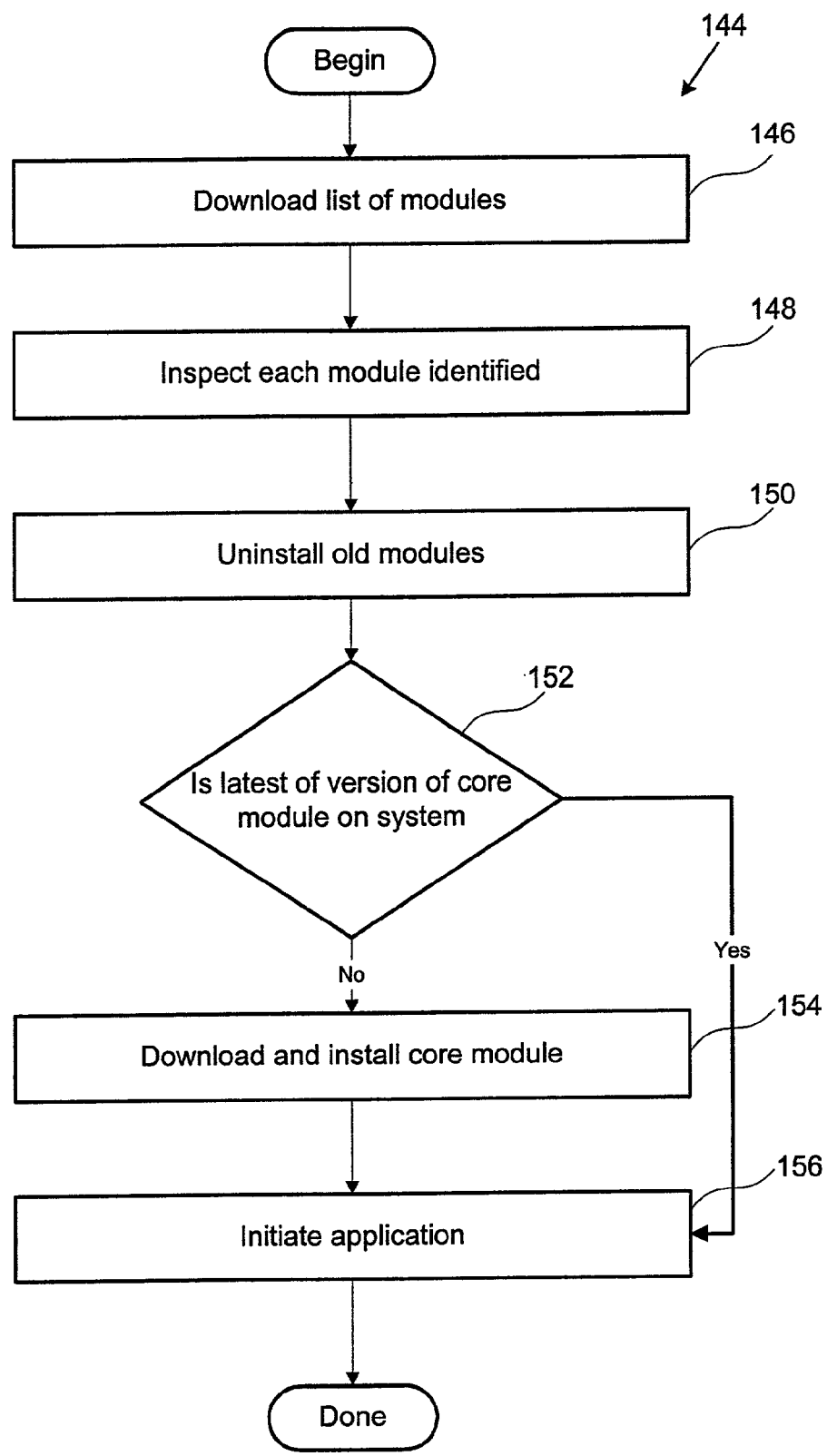
FIG. 3 illustrates a flowchart depicting a high level method where the JAVA software loader downloads and installs the application in accordance with one embodiment of the invention.

FIG. 3 illustrates flowchart 144 depicting a high level method where the JAVA loader downloads and installs the application and its components in accordance with one embodiment of the invention. The method initiates with operation 146 where a list of modules used by the application of operation 124 is downloaded. In one embodiment, the list of modules includes the name of the modules and version information of the modules. An example of the list of the modules is presented in FIG. 4 and will be explained in more detail below.

Figure 4:
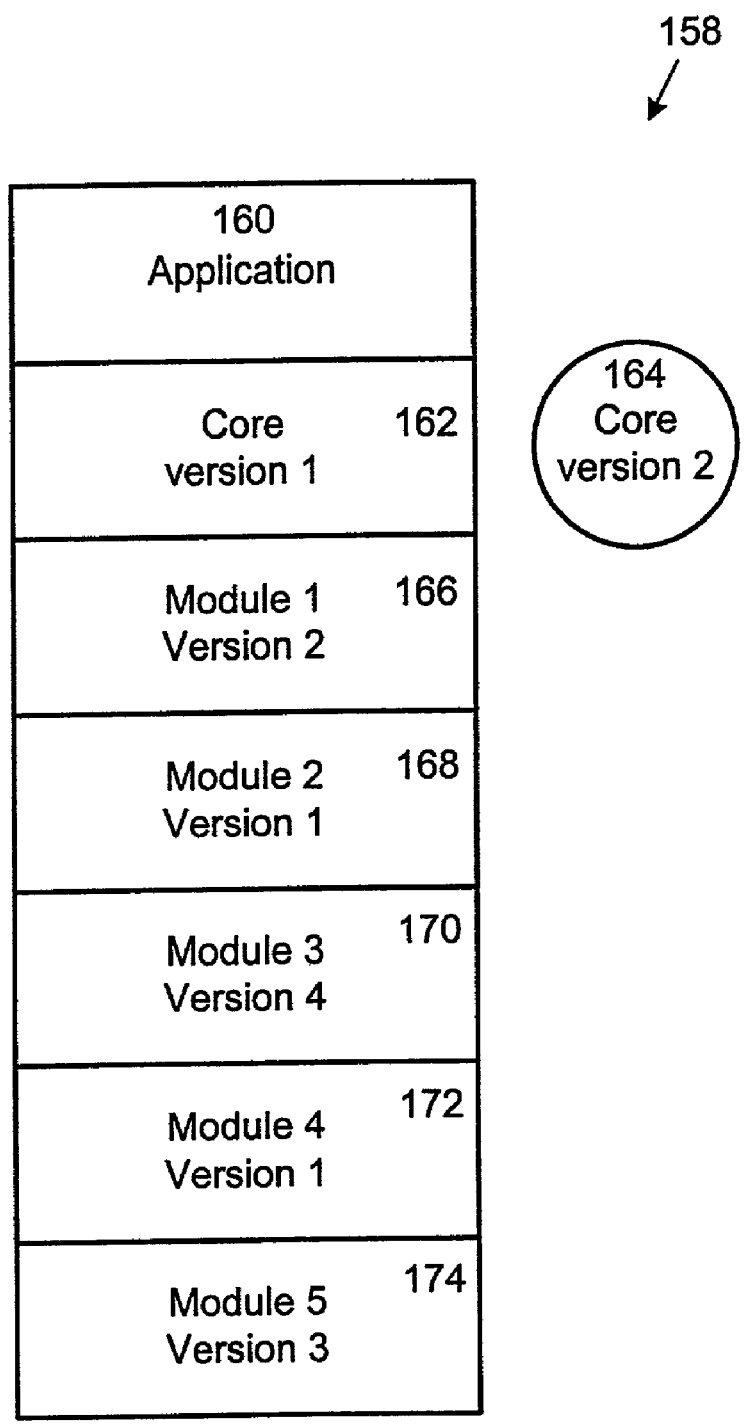
FIG. 4 illustrates a block diagram displaying the list of modules downloaded in operation 146 of FIG. 3 in accordance with one embodiment of the invention.

Moving to FIG. 4, block diagram 158 illustrates the list of modules downloaded in operation 146 of FIG. 3 in accordance with one embodiment of the invention. It should be understood that the list of modules illustrated in block diagram 158 are simply illustrative of a number of modules, and thus, any number of modules may exist depending on the software application and use thereof. With the foregoing in mind, application 160, core modules and multiple non-core modules are shown. Here, it is shown that core module version 1 162 has been superseded by core module version 2 164. Accordingly, the list of modules downloaded in operation 146 of FIG. 3 includes only the most recent version of the core module, i.e. version 2 164 in one embodiment. It should be appreciated that core module version 1 is being displayed for illustrative purposes only. The list of FIG. 4 further includes modules 1–5, represented as blocks 166–174. In one embodiment of the invention, the list of modules used by the application is compared to the modules on the local system to determine which modules the system requires to be downloaded.

Returning back to FIG. 3, the method advances to operation 148 where the JAVA loader will inspect each module on the list to verify if the module is present on the local system. For example, each of the modules of FIG. 4, i.e. modules 164–174, are checked to determine if they are already present on the local system. Next, in operation 150 any old versions of the modules identified by operation 148 are uninstalled. For example, if the local system had core version 1 162 loaded from a prior use of the application, then it would be uninstalled here. Additionally, if any older versions of the non-core modules are on the local system, then they are uninstalled. In one embodiment, if the older version of the non-core module is a shared module, then the non-core module is not uninstalled. Then, the method proceeds to decision operation 152 where it is determined if the latest version of the core module is on the system. If the latest version of the core module in not on the system, then the latest version of the core module is downloaded and installed in operation 154. In one embodiment of the invention, the core module contains the class that has the entry point. In another embodiment of the invention, the class that has the entry point is requested by the JAVA loader to initiate the downloading of the core module. If the latest version of the core module is on the local system, then the method advances to operation 156 where the application is initiated.

Figure 5:
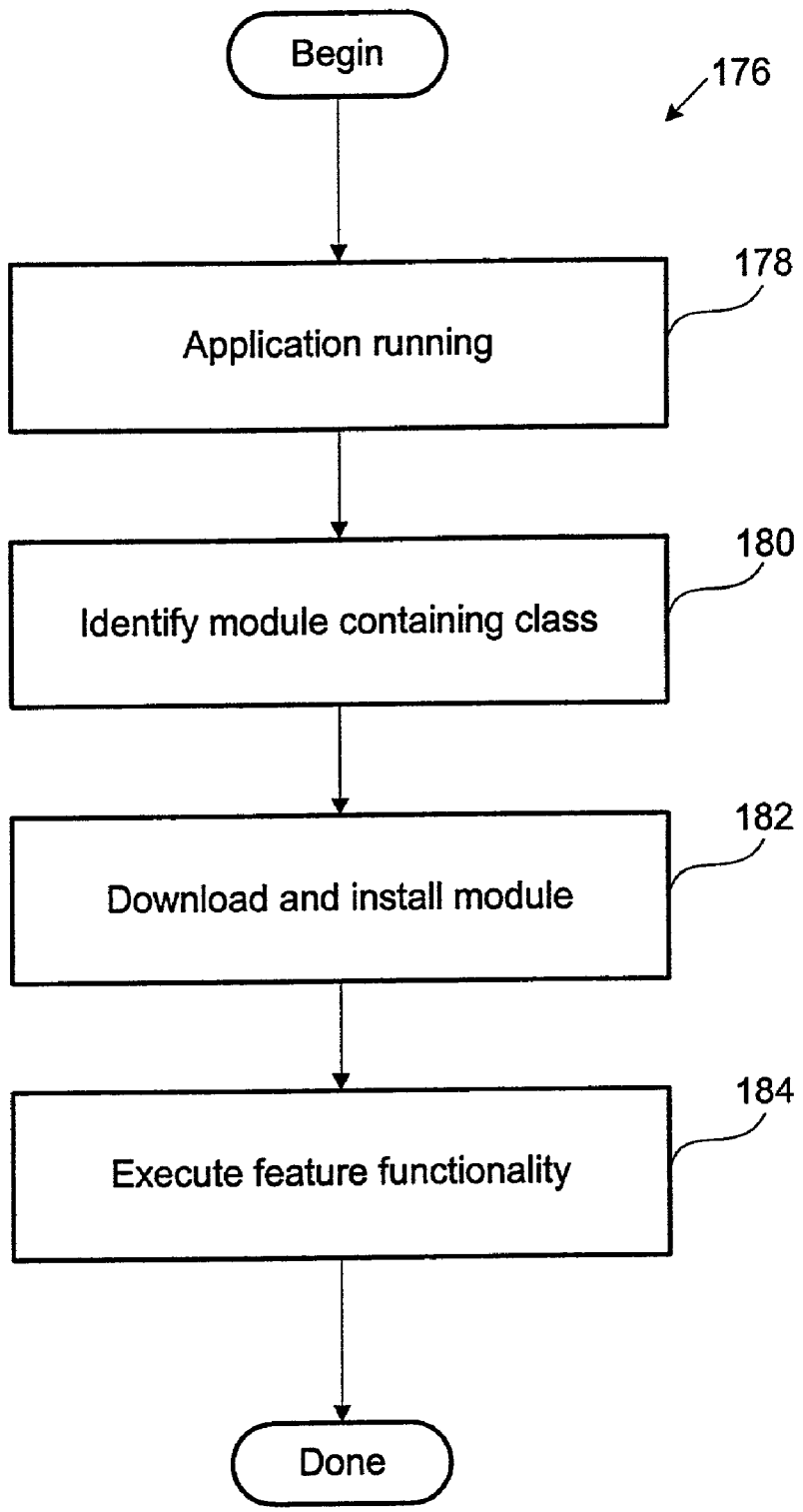
FIG. 5 illustrates a flowchart displaying a method of where modules are downloaded and installed when needed as the application is running in accordance with one embodiment of the invention.

FIG. 5 illustrates flowchart 176 displaying a method where modules are downloaded and installed when needed as the application is running in accordance with one embodiment of the invention. Flowchart 176 initiates with operation 178 where the application is running on the local system. It should be appreciated that as the user is running the application and utilizing different functionality, eventually a module besides the core module will be required. Following the example of a printer, a class not included in the core module may be required for some operation such as printing, editing, formatting, etc. The method then advances to operation 180 where the module containing the required class is identified. The method moves to operation 182 where the module containing the required class is downloaded and installed on the local system. For example, referring back to FIG. 4, if module 4 172 is needed for a particular feature of the application, then module 4 172 will be downloaded and installed. The method advances to operation 184 where the feature functionality provided by the class of the downloaded module is executed. After operation 184 the method returns to operation 178 where the application continues running. Of course, components of the application are generally, in one embodiment, running in the background. A user can also quit or exit out of the application when they desire.

Figure 6:
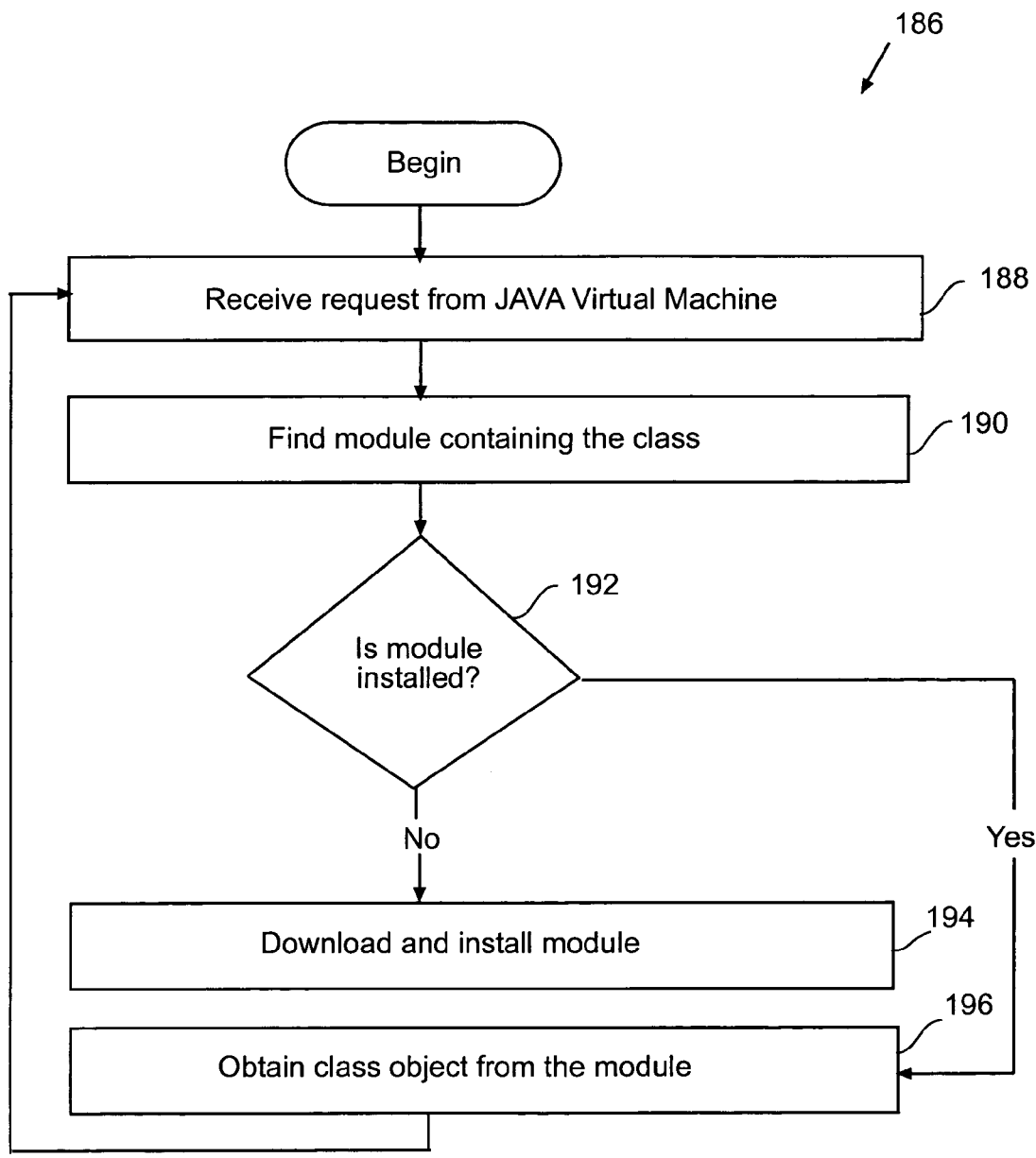
FIG. 6 illustrates a flowchart displaying a more detailed description of downloading the modules for the application in accordance with one embodiment of the invention.

FIG. 6 illustrates flowchart 186 displaying a more detailed description of downloading the modules for the application in accordance with one embodiment of the invention. Flowchart 186 initiates with operation 188 where a request is received from the JAVA Virtual Machine (JVM). For example, when initially starting the application a class loader will receive a request from the JAVA Virtual Machine to run the main class in one embodiment. The main class is contained within the core module in another embodiment of the invention. It should be appreciated that the JAVA Virtual Machine is only concerned with classes and not modules, while the class loader maps classes into modules.

The method then advances to operation 190 where the module containing the class is found. Operation 190 will be explained in more detail in reference to FIG. 7. Next, in decision operation 192 it is determined if the module found in operation 190 is installed on the local system. If the module is not on the local system, then the module is downloaded and installed in operation 194. If the module is installed on the local system, then the method advances from operation 192 to operation 196 where the class object desired is obtained from the module.

Once the method of FIG. 6 obtains the class object from the module, the method returns to operation 188. In one embodiment the class object is returned to the JAVA Virtual Machine here. It should be appreciated that upon the initial loading of the application to the local system, the class containing the entry point asks for the next class and so on until all interrelated classes are loaded. In one embodiment, the main class containing the entry point is mapped into the core module. As an illustrative example, class A contains the entry point and upon initiation is requested first by the JAVA Virtual Machine. Class A will request class B and so on, until all interrelated classes consisting of the core module are loaded.

The above illustrative example is also applicable to other non-core modules which allow for feature functionality. Once the classes comprising the core module are installed a user may elect to perform tasks which require feature functionality. In the example of a printer and its applications, the user may wish to rotate or print a graphic. Once the rotate or print button is activated, then code will ask the JAVA Virtual Machine for a class enabling the feature functionality. Accordingly, the JAVA Virtual Machine will request the class required for the feature functionality and operations 188–196 will be repeated for the required class and all interrelated classes. As will be explained in further detail in reference to FIGS. 8–10, the modules enabling feature functionality may also be downloaded in the background prior to being requested by the user in another embodiment.

Flowchart 190 initiates with operation 198 where the JAVA Virtual Machine requests the class loader to load a class. The method advances to operation 200 where the installed module is searched for the requested class. One skilled in the art would appreciate that various techniques are available to search the data structure for the requested class. The method then proceeds to decision operation 202 to determine if the requested class has been found. If the class is found on the installed modules of the local system then the class is returned to the JAVA Virtual Machine in operation 204.

Figure 7:
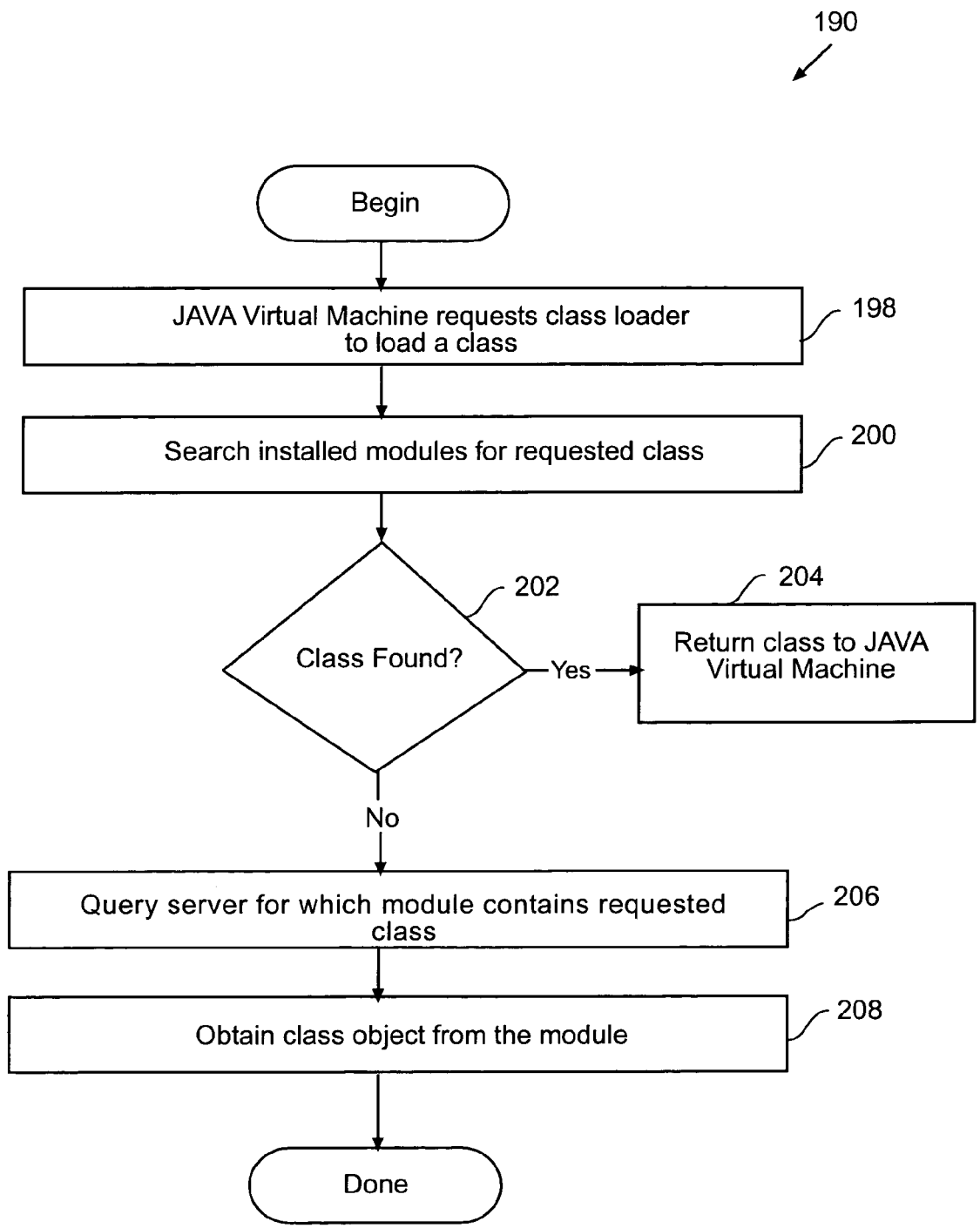
FIG. 7 illustrates a flowchart depicting a more detailed description of operation 190 of FIG. 6 where a module containing a requested class is located through a class loader thread in accordance with one embodiment of the invention.

If the class is not found, then the method of FIG. 7 proceeds to operation 206 where the server is queried for which module contains the requested class. In one embodiment, each class is associated with a module on the server, i.e. the server has a data structure that matches the classes to the modules. Accordingly, the module containing the requested class is identified here in one embodiment of the invention. The method proceeds to operation 208 where the module containing the requested class is downloaded. In one embodiment, the module is downloaded interrelated class by interrelated class as discussed with reference to FIG. 6. In yet another embodiment, the downloaded module is also installed. Table 1, below, includes illustrative code for installing the module in accordance with one embodiment of the invention. Of course, the code can take on any form, so long as the installing function is completed.

TABLE 1

```
* Copyright (c) 1995–2001 EPSON Palo Alto Laboratory. All Rights
Reserved.
"
// Load the package contained in zf.
public static void installPackage (File zFile) throws IOException {
    ZipFile zf = new ZipFile (zFile) ;
    try {
        ArchiveInfo ai = new ArchiveInfo (zf) ;
        // save resource files
        for (Enumeration e = zf.entries( ) ; e.hasMoreElements( ) ; ) {
            ZipEntry ze = (ZipEntry) e.nextElement( ) ;
            String zipName = ze.getName( );
            if ( !zipName.endsWith (".class")) {
                ze = zf.getEntry (zipName) ;
                zipName = zipName.replace('\\','/');
                InputStream is = zf.getInputStream(ze);
                if (ai.isSharedModule( )) {
                    saveResource (SmartLauncher.getSharedResourceDir( ) , zipName, is) ;
                } else {
                    saveResource (SmartLauncher. getAppResourceDir( ) , zipName, is) ; }
            }
        }
    }
    // Find system class files and install them to the shared class directory.
    for (Enumeration e = ai.getSystemClasses( ).elements ( ); e.hasMoreElements( ); ) {
            String sysClass = (String) e.nextElement( );
            ZipEntry ze = getZipEntryFromClassName (zf, sysClass) ;
            if (ze = = null) {
                    throw new IOException ("Can not find system class" + sysClass) ;
            }
            InputStream is = zf.getInputStream (ze) ;
            saveClass (SmartLauncher.getSharedSystemClassDir( ) , sysClass, is) ;
            }
    // Find system class files and install them to the shared class directory.
    for (Enumeration e = ai.getSystemResources( ) .elements( ) ; e.hasMoreElements( ) ; ) {
            String sysResource = (String) e.nextElement( );
            ZipEntry ze = zf.getEntry (sysResource);
            if (ze = = null) {
                throw new IOException ("Can not find system class " + sysResource) ;
            }
            InputStream is = zf.getInputStream (ze) ;
            SaveResource (SmartLauncher.getSharedSystemClassDir( ) , sysResource, is);
            }
    // Call install function
    if (ai.getMetaClass( ) ! = null) {
            try ≡
                InstallClassLoader installLoader = new InstallClassLoader (zf);
                Class clsMeta = installLoader.loadClass (ai.getMetaClass( ), true) ;
                Object mc = clsMeta.newInstance( ) ;
                Class[ ] clsParams = { java.util.Hashtable.class } ;
                Method m = clsMeta.getMethod("install" , clsParams) ;
                Object[ ] objParams = { createInstallProperties (getSmartClassLoader( ) , zf) } ;
                // Call install function.
```

TABLE 1-continued

```
                m.invoke (mc, objParams) ;
            } catch (Exception e) {
                // Can not call meta class install.
                System.out.println ("Install function ignored in class " + ai.getMetaClass( )) ;
            }
        }
    } finally {
            zf.close( ) ;
    }
}
```

Figure 8:
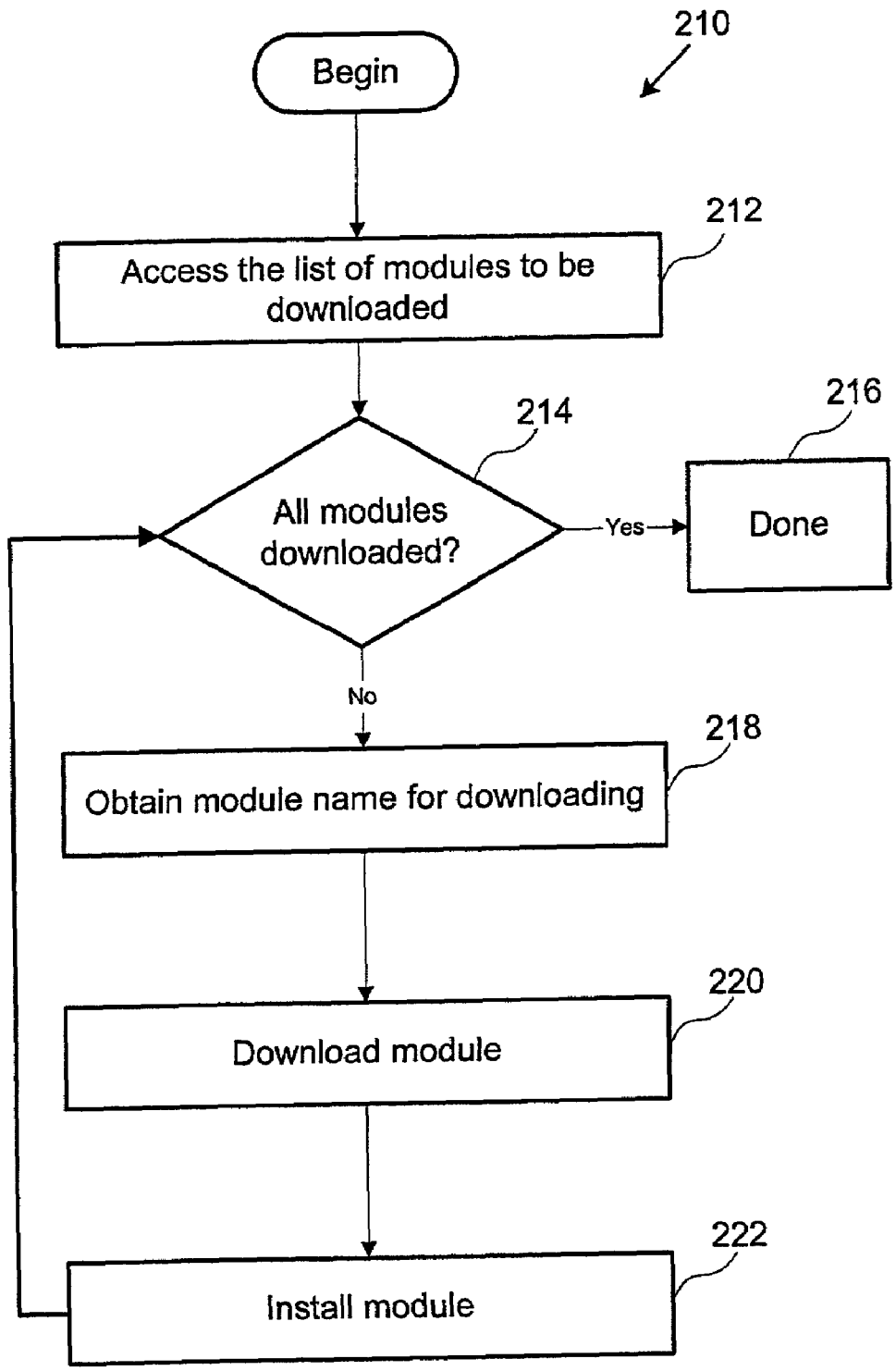
FIG. 8 illustrates a flowchart representing a method for performing background downloading in a multithread environment once the main application has started in accordance with one embodiment of the invention.

FIG. 8 illustrates flowchart 210 representing a method for performing background downloading in a multithread environment once the main application has started in accordance with one embodiment of the invention. It should be appreciated that the method of flowchart 210 can operate in a multithread environment with the method described in reference to FIG. 7. Flowchart 210 initiates with operation 212 where the list of modules to be downloaded is accessed. In one embodiment, the list of modules includes a priority list representing the order in which the modules are downloaded in the background environment. An exemplary priority list is described below in reference to FIG. 9.

Figure 9:
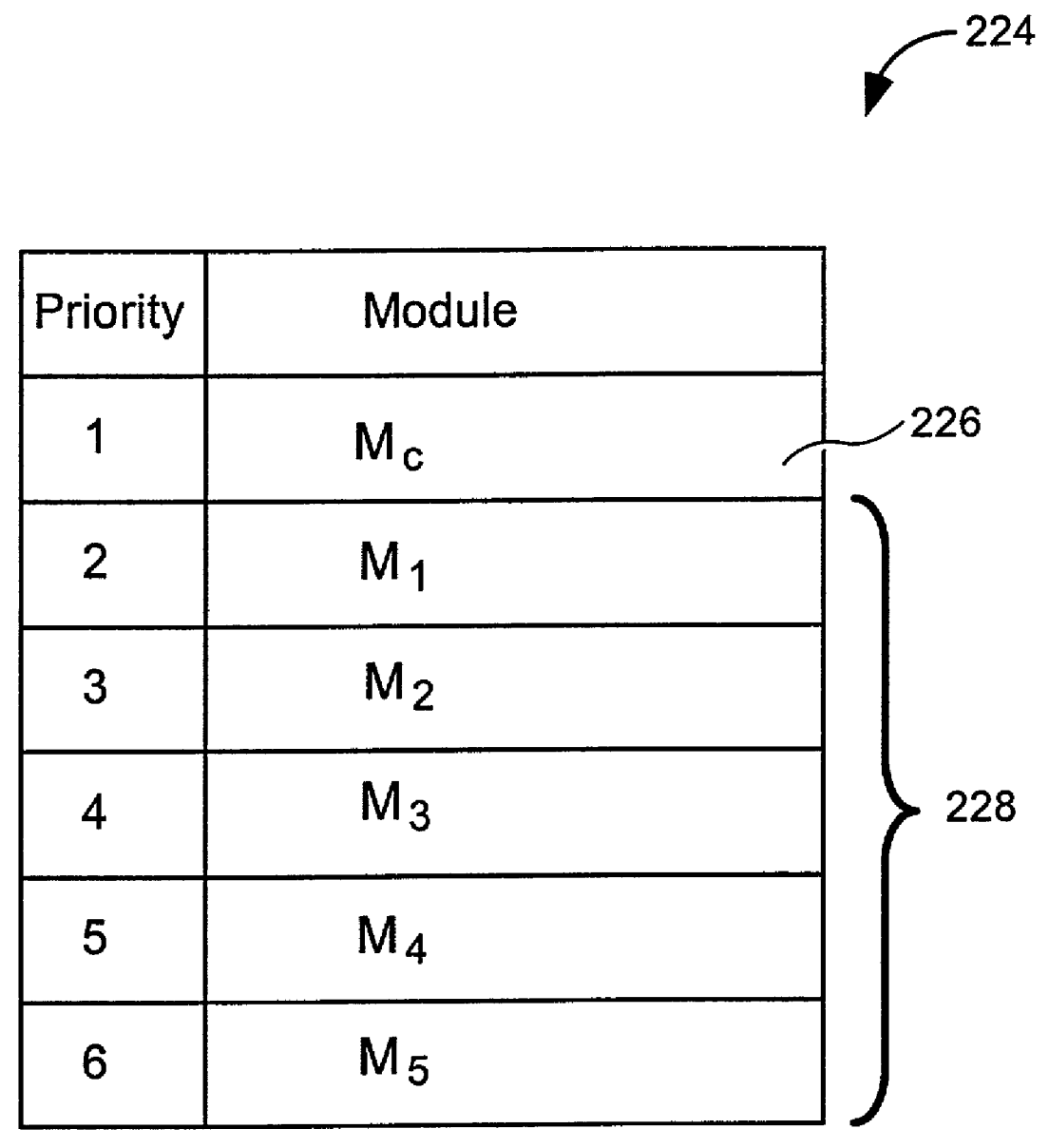

FIG. 9 illustrates block diagram 224 representing a priority list of the various modules to be downloaded for an application in accordance with one embodiment of the invention. As displayed in block diagram 224, each module including the application is assigned a priority. For example, the core module ($M_c$) 226 is assigned a priority of 1, the highest priority. The core module must be downloaded first, therefore, $M_c$ must receive the highest priority. The remaining modules, $M_1$–$M_5$, 228 are associated with priorities 2–6, respectively. In one embodiment, the priority list is contained on a networked source server (e.g., which contains the application and its modules). As will be explained further below, the local system may have some of the modules installed from running the application previously. In this situation, the download manager is initialized with a list of needed modules to be downloaded, thereby ensuring that the download manager will not download modules which are already installed. The list of modules may also be the list of modules of FIG. 4 with a priority included in one embodiment of the invention.

Returning back to FIG. 8, once the priority list is accessed in operation 212 the method advances to decision operation 214 where it is checked if all the modules are downloaded on the local system. Here, the list of modules as discussed in reference to FIGS. 3, 4 and 9 is checked to determine which modules, if any, need to be downloaded. If all the modules from the list are installed on the local system, then the method ends in operation 216. If all the modules have not been downloaded, then the method proceeds to operation 218 where a module name for downloading is obtained. For example, if $M_c$ and $M_2$ are already installed locally on the system, then the module name for $M_1$ will be obtained in operation 218 since $M_1$ is the highest priority module remaining. The module corresponding to the module name obtained in operation 218 is downloaded in operation 220. The downloaded module is then installed in operation 222. It should be appreciated that the example code for installing the module, as presented in Table 1, may be executed in operation 222 in accordance with one embodiment of the invention. The loop involving operations 214–222 will repeat itself until all modules have been downloaded.

Figure 10:
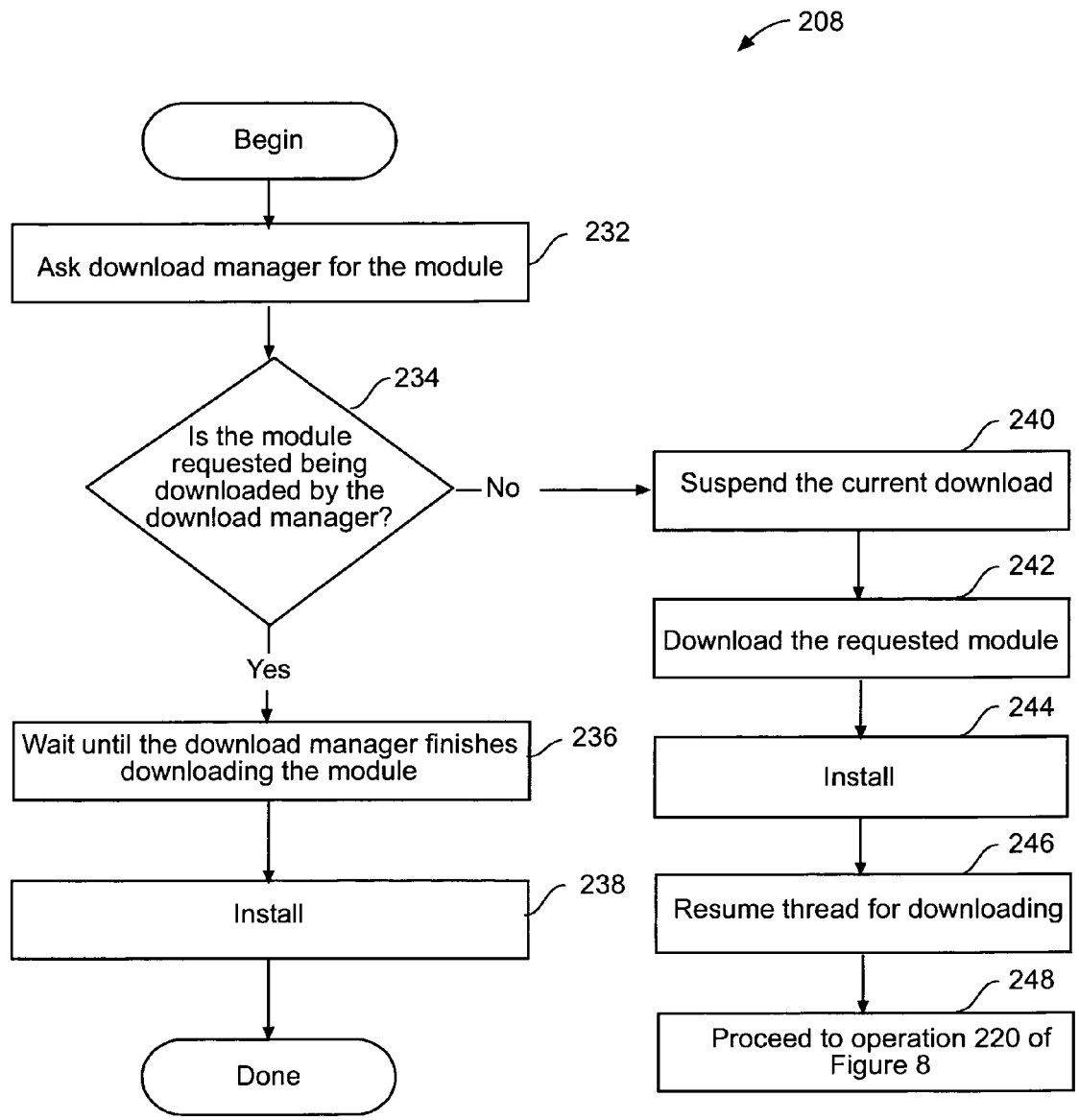
FIG. 10 illustrates a flowchart displaying a more detailed description of operation 208 of FIG. 7 where a module is downloaded in a multithread environment under the download manager logic in accordance with one embodiment of the invention.

FIG. 10 illustrates flowchart 230 displaying a more detailed description of operation 208 of FIG. 7, where a module is downloaded in a multithread environment under the download manager logic in accordance with one embodiment of the invention. Flowchart 208 initiates with operation 232 where the download manager is asked for the module to be downloaded. It should be appreciated that the class loader has control here. The method proceeds to decision operation 234 where it is determined if the module requested is the module being downloaded by the download manager. If the module requested is the module being downloaded by the download manager, then the method moves to operation 236 where the method waits until the download manager completes downloading the module. It should be appreciated that common pausing techniques known to one skilled in the art can be utilized in this operation.

Alternatively, if the module requested is not the module being downloaded by the download manager in decision operation 234 of FIG. 10, then the method proceeds to operation 240 where the current download is suspended. For example, a user wishes to rotate an image and needs module 4 ($M_4$) for the feature functionality. However, the module being downloaded by the download manager is module 3 ($M_3$). The download of $M_3$ is suspended in operation 240 so that $M_4$ may be downloaded without competing with $M_3$ for bandwidth. In one embodiment of the invention, the download manager logic comprising this decision operation is only initiated when the user interrupts the methodical download of the modules as governed by the priority list. The method advances to operation 242 where the requested module is downloaded. Continuing with the example above, $M_4$ would be downloaded here as $M_3$ is suspended. In one embodiment, another instantiation of the code which was downloading $M_3$ is used to download $M_4$. In operation 244, the requested module is installed. The method moves to operation 246 where the thread for the suspended download is resumed. In reference to the above example, the downloading of $M_3$ is resumed upon the installation of $M_4$. Then in operation 248, the method proceeds to operation 220 of FIG. 8 where the module is downloaded.

Table 2, below, includes illustrative code for class loader in accordance with one embodiment of the invention. Of course, the code can take on any form, so long as the class loading function is completed.

TABLE 2

```
/*
"
* $Workfile: SmartClassLoader.java $
"
*
"
* Copyright © 1995-2001 EPSON Palo Alto Laboratory. All Rights Reserved.
"
* EPSON Research and Development, Inc. A Seiko EPSON Subsidiary. * All rights
reserved.
*
*/
package epal.compman;
import java.util.*;
import java.util.zip.*;
import java.io.*;
import java.net.*;
import java.lang.*;
import java.lang.reflect.*;
/**
 * Class description goes here.
 *
 *
 */
public class SmartClassLoader extends java.lang.ClassLoader {
    // maps from the class name to the loaded Class object.
    private Hashtable m_classCache = new Hashtable( );
    // maps from the package name to the archive file.
    private Hashtable m_packageMap = new Hashtable( );
    // maps from the class name to the archive file.
    private Hashtable m_classMap = new Hashtable( );
    // maps from the resource name to the archive file.
    private Hashtable m_resourceMap = new Hashtable( );
    public SmartClassLoader( ) throws IOException {
        super( );
    }
    public URL getResource(String name) {
        URL url = getSystemResource(name);
        if (url != null)
            return url;
        String szResourceFile = name.replace('/', File.separatorChar);
        File f = new File(SmartLauncher.getAppResourceDir( ), szResourceFile);
        try {
            return new URL("file", "localhost", f.getAbsolutePath( ));
        } catch (Exception e) {
            return null;
        }
    }
    public InputStream getResourceAsStream(String name) {
        InputStream is = getSystemResourceAsStream(name);
        if (is != null)
            return is;
        String szResourceFile = name.replace('/', File.separatorChar);
        File f = new File(SmartLauncher.getAppResourceDir( ), szResourceFile);
        try {
            return new FileInputStream(f);
        } catch (Exception e) {
            return null;
        }
    }
    protected Class loadClass(String name, boolean resolve) throws
ClassNotFoundException {
//      System.out.println(name);
        if (name.indexOf("PIMJpegNative") != -1) {
            int i = 10;
        }
        if (name.indexOf("JopsDecoder") != -1) {
            int i = 10;
        }
        // Check if the class has been loaded before.
        Class c = (Class) m_classCache.get(name);
        if (c != null) {
            if (resolve) {
                resolveClass(c);
            }
            return c;
        }
        ArchiveInfo ai = (ArchiveInfo) m_classMap.get(name);
        if (ai != null) {
```

TABLE 2-continued

```
            // Check the version of the ArchiveInfo here.
            // Hack: Assume always ok.
            // the class can be loaded from the zip files.
            // Now check if the class should be loaded from the system.
            if (ai.getSystemClasses( ).indexOf(name) != -1) {
                // This is a class that should be loaded by the system class loader
                c = findSystemClass(name);
            } else {
                // Load from the zip file.
                ZipEntry ze = SmartLauncher.getZipEntryFromClassName(ai.getZipFile( ),
name);
                try {
                    c = loadClassFromZipEntry(ai.getZipFile( ), ze, name);
                } catch (IOException e) {
                    throw new ClassNotFoundException("Can not find class " + name);
                }
            }
        } else {
            // The class can not be loaded from the zip files.
                try {
                    // Try to load from the system.
            c = findSystemClass(name);
                } catch(Exception e) {
                    // The class can not be loaded from the zip files nor from the system.
                    // This class may be:
                    //   1. a resource bundle classed requested that is not found.
                    //   2. a class that should be downloaded or installed.
                    if (isResourceBundleClass(name)) {
                // The VM is requesting a package bundle class.
                throw new ClassNotFoundException( );
                    }
            // The class can not be found by the system. Try to download the class and
install it.
            try {
                File f = SmartLauncher.getDownloadManager( ).getZipFile(name);
                SmartLauncher.getSmartClassLoader( ).loadPackage(f);
            } catch (Exception ioe) {
                throw new ClassNotFoundException(ioe.getMessage( ));
            }
            ai = (ArchiveInfo) m_classMap.get(name);
            if (ai == null) {
                // We should find the class here.
                throw new ClassNotFoundException( );
            } else {
                try {
                    if (ai.getSystemClasses( ).indexOf(name) != -1) {
                        // This is a class that should be loaded by the system class loader
                        c = findSystemClass(name);
                    } else {
                        // Load from the zip file.
                        ZipEntry ze =
SmartLauncher.getZipEntryFromClassName(ai.getZipFile( ), name);
                        c = loadClassFromZipEntry(ai.getZipFile( ), ze, name);
                    }
                } catch (Exception ex) {
                    throw new ClassNotFoundException(ex.getMessage( ));
                }
            }
        }
    }
    if (resolve) {
        resolveClass(c);
    }
    m_classCache.put(name, c);
    return c;
}
public void loadPackages( ) throws IOException {
    File dir = SmartLauncher.getAppDir( );
    String[] zfname = dir.list( );
    if (zfname != null) {
        for (int i = 0; i < zfname.length; i++) {
            if (zfname[i].endsWith(".zip")) {
                try {
                    loadPackage(new File(dir, zfname[i]));
                } catch (ZipException ze) {
                    File f = new File(dir, zfname[i]);
                    f.delete( );
                }
            }
```

TABLE 2-continued

```
            }
        }
        dir = SmartLauncher.getsharedDir( );
        zfname = dir.list( );
        if (zfname != null) {
            for (int i = 0; i < zfname.length; i++) {
                if (zfname[i].endsWith(".zip")) {
                    try {
                        loadPackage(new File(dir, zfname[i]));
                    } catch (ZipException ze) {
                        File f = new File(dir, zfname[i]);
                        f.delete( );
                    }
                }
            }
        }
    }
    public void loadPackage(File fZipFile) throws IOException {
        ZipFile zf = new ZipFile(fZipFile);
        ArchiveInfo ai = new ArchiveInfo(zf);
        // Load the classes.
        for (Enumeration e = zf.entries( ); e.hasMoreElements( );) {
            ZipEntry ze = (ZipEntry) e.nextElement( );
            String zipName = ze.getName( );
            if (zipName.endsWith(".class")) {
                String className = getClassNameFromZipName(zipName);
                m_classMap.put(className, ai);
                m_packageMap.put(getPackageName(className), ai);
            } else {
                zipName = zipName.replace('\\','/');
                m_resourceMap.put(zipName, ai);
            }
        }
    }
    // Load a class contained in ze.
    private Class loadClassFromZipEntry(ZipFile zf, ZipEntry ze, String className)
throws IOException {
        String szZipName = ze.getName( );
        InputStream is = zf.getInputStream(ze);
        ByteArrayOutputStream baos = new ByteArrayOutputStream( );
        byte[] tempBuf = new byte[1024];
        int bytesRead = 0;
        try {
            do {
                bytesRead = is.read(tempBuf,0,1024);
                if (bytesRead > 0) {
                    baos.write(tempBuf,0,bytesRead);
                }
            } while (bytesRead >= 0);
        } catch (EOFException eofex) {
            // This is fine.
        }
        is.close( );
        byte[] clsData = baos.toByteArray( );
        return defineClass(className, clsData, 0, clsData.length);
    }
    private String getClassNameFromZipName(String zipName) {
        int index = zipName.lastIndexOf(".class");
        if (index <= 0)
            return null;
        String className = zipName.replace('/','.');
        className = className.replace('\\','.');
        return className.substring(0, index);
    }
    /**
        Returns the package name of a class.
     */
    private String getPackageName(String className) {
        int index = className.lastIndexOf(".");
        if (index <= 0)
            return " ";
        return className.substring(0, index);
    }
    private String getBaseclassName(String name) {
        int iBegin = Math.max(0, name.lastIndexOf("."));
        int iEnd = name.indexOf("_", iBegin);
        if (iEnd == -1) {
            return name;
        }
```

TABLE 2-continued

```
        return name.substring(O, iEnd);
    }
    private boolean isResourceBundleClass(String name) {
        String base = getBaseclassName(name);
        base = base.replace('.', File.separatorChar);
        File f = new File(SmartLauncher.getAppResourceDir( ), base + ".properties");
        if (f.exists( ))
            return true;
        return false;
    }
}
```

While the above described invention has been described in the general context of an application program that is executed on an operating system in conjunction with a personal computer, it should be appreciated that the invention may be implemented with other routines, programs, components, data structures, etc. which perform particular tasks or implement particular abstract data types. Furthermore the invention may be practiced with other computer system configurations including hand-held devices, microprocessor systems, microprocessor-based or programmable consumer electronics, minicomputers, mainframe computers and the like. The invention may also be practiced in distributing computing environments where tasks are performed by remote processing devices that are linked through a communications network.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data which can be thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method of distributing a software application over a network having a network server and a client device, comprising:

partitioning said software application into a plurality of software modules each module encapsulating a partial functionality of said software application, wherein:
A) the full functionality of said software application is defined by a cumulative contribution of all of said software modules;
B) at least one of said software modules is a core module providing a software engine of said software application; and
C) said network server manages access to said software modules;

having said client device request said software application from said network server;

having said network server respond to said request for said software application by transferring only the core module to said client device for execution, wherein during the execution of said core module by said client device, upon said execution necessitating a functionality not provided by said core module and not available within said client device, having said core module:
i) identify a target module within said plurality of software modules that provides said necessitated functionality;
ii) automatically acquiring and installing said targeted module via said network; and
iii) executing said necessitated functionality from said target module.

2. The method of claim 1, wherein when said core module is executed, said core module determines which of said plurality of modules are absent from said client device, and initiates downloading of said missing modules while executing its engine function on said client device.

3. The method of claim 2, wherein said downloading of missing modules is a background download function as defined by said client device not providing a readily displayed indication of the downloading function.

4. The method of claim 2, wherein if said core module is downloading an absent module when said execution of said core module necessitates a functionality not provided by said core module and not available within said client device, and said core module finishes the downloading of said absent module if said absent module is said target module, or halts the downloading of said absent module prior to automatically acquiring and installing said targeted module if said absent module is not said target module.

5. The method of claim 1, wherein said core module:
monitors past user-selections of software functions to predict probable future user-selections of software functions; and
determines if a future functionality required by said probable future user-selections of software functions is provided by said core module or is available within said client device, and if it is not, then said core module:
identifies a specific module within said plurality of software modules that provides said future functionality; and
automatically acquires and installs said specific module via said network.

6. The method of claim 1, wherein said core module provides a graphics user interface function for listing a selection of functions available by said software application, including functions not available within said core module.

7. The method of claim 6, wherein said core module provides said graphics users interface (GUI) by acquiring over said network and installing one of said plurality of modules that executes a GUI function.

8. The method of claim 1, wherein said network is the internet.

9. A system for distributing a software application over a network, comprising:
a network server having a access to a data store having a plurality of software modules each module encapsulating a partial functionality of said software application, wherein:
A) the full functionality of said software application is defined by a cumulative contribution of all of said software modules;
B) at least one of said software modules is a core module providing a software engine of said software application; and
C) said network server manages access to said software modules; and
a client device effective for requesting said software application from said network server;
wherein said network server responds to a request from said client device for said software application by transferring only the core module to said client device for execution, wherein during the execution of said core module by said client device, upon said execution necessitating a functionality not provided by said core module and not available within said client device, said client device:
i) identifies a target module within said plurality of software modules that provides said necessitated functionality;
ii) automatically acquires and installs said targeted module via said network onto said client device; and
iii) executes said necessitated functionality from said target module.

10. The system of claim 9, wherein when said core module is executed, said client device determines which of said plurality of modules are absent from said client device, and initiates downloading of said missing modules while executing its engine function on said client device.

11. The system of claim 10, wherein said downloading of missing modules is a background download function as defined by said client device not providing a readily displayed indication of the downloading function.

12. The system of claim 10, wherein if said client device is downloading an absent module when said execution of said core module necessitates a functionality not provided by said core module and not available within said client device, and said client device finishes the downloading of said absent module if said absent module is said target module, or halts the downloading of said absent module prior to automatically acquiring and installing said targeted module if said absent module is not said target module.

13. The system of claim 9, wherein said client device:
monitors past user-selections of software functions to predict probable future user-selections of software functions; and
determines if a future functionality required by said probable future user-selections of software functions is provided by said core module or is available within said client device, and if it is not, then said client device:
identifies a specific module within said plurality of software modules that provides said future functionality; and
automatically acquires and installs said specific module via said network.

14. The system of claim 9, wherein said core module provides a graphics user interface function for listing a selection of functions available by said software application, including functions not available within said core module.

15. The system of claim 14, wherein said core module provides said graphics users interface (GUI) by acquiring over said network and installing one of said plurality of modules that executes a GUI function.

16. The system of claim 9 wherein said network is the internet.

* * * * *